Dec. 18, 1923.

F. P. GRIFFITH ET AL

VEHICLE

Filed Oct. 5, 1923  2 Sheets-Sheet 2

Inventors
F.P. Griffith
J. Lindsay
H.G. Geoghegan
By Marks & Clerk
Attys.

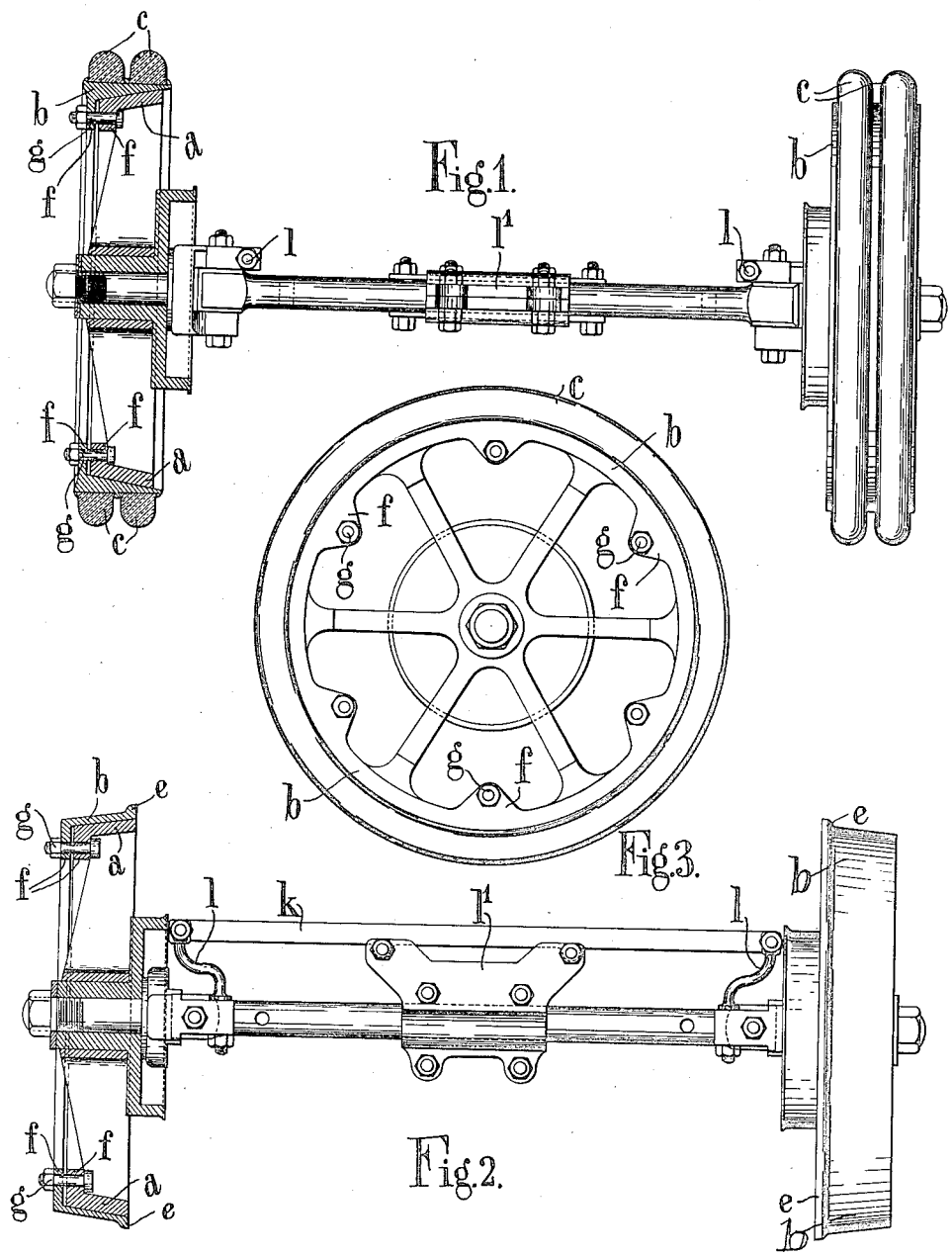

Patented Dec. 18, 1923.

1,477,949

UNITED STATES PATENT OFFICE.

FREDERICK P. GRIFFITH, JAMES LINDSAY, AND HOWARD GRACE GEOGHEGAN, OF DUBLIN, IRELAND.

VEHICLE.

Application filed October 5, 1923. Serial No. 666,828.

*To all whom it may concern:*

Be it known that we, FREDERICK PURSER GRIFFITH, JAMES LINDSAY, and HOWARD GRACE GEOGHEGAN, all subjects of the King of Great Britain and Ireland and all residing at 17 Westland Row, Dublin, Ireland, have invented certain new and useful Improvements in or Relating to Vehicles, of which the following is a specification.

This invention relates to vehicles of the kind having wheels each of which may be adapted for either road or rail traffic.

The object of the present invention is to devise an improved form of vehicle wheel which may be adapted for either road or rail traffic and which meets the requirement when employed for rail traffic that the rail tires may always be accurately set to the proper gauge and the invention consists in a method of rendering a vehicle adaptable for both road and rail traffic which consists in providing each wheel with a fixed rim coned or inclined throughout its width and arranging thereon a removable similarly coned or inclined rim adapted for rail traffic in substitution for a similar removable rim adapted for road traffic and vice versa, there being a metal to metal contact between the rims.

The accompanying drawings illustrate two modes of carrying out the invention.

Figure 1 is a part sectional elevation of a front axle and wheels in accordance with the invention.

Figure 2 is a similar view to Figure 1 showing the wheels adapted for rail transport.

Figure 3 is a side elevation of a wheel, and

Figure 4:
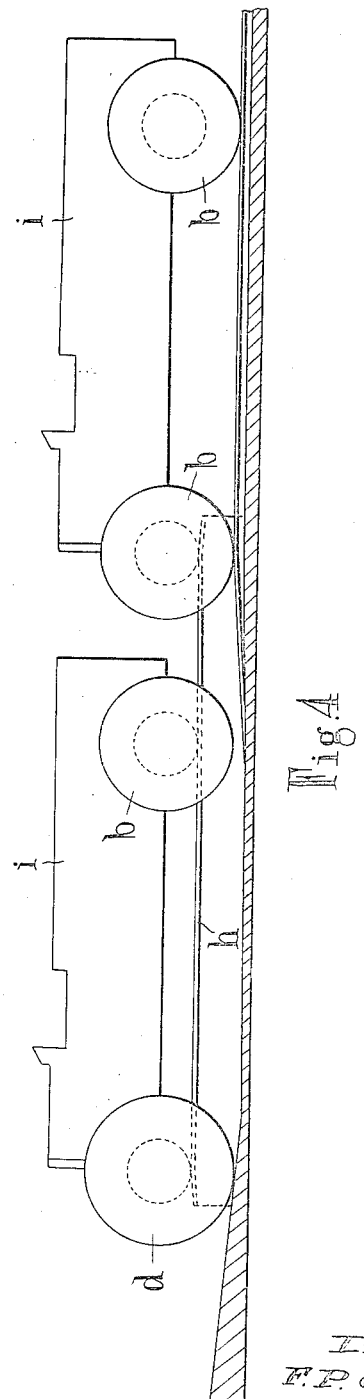
Figure 4 is a diagrammatic view showing one arrangement provided for facilitating the changing of tires.

In carrying our invention into effect in one convenient manner, we form our improved vehicle with a set of wheels, each of which has a fixed rim $a$ of substantial width and coned or tapered so that the smaller diameter is outside, such rim being adapted to receive a correspondingly coned or tapered removable rim $b$ of one form or another according as the vehicle is to be used for rail or road traffic.

When required for road traffic the removable rim $b$ may be provided as shown in Figure 1 with one or more circumferential rubber or like resilient tires $c$ suitable for road traffic and when required for railway traffic the rim $b$ takes the form of a plain annular metal tire corresponding to standard railway wheel practice and formed with the usual flange $e$.

The taper of the fixed and removable rims is made comparatively steep in order to avoid jamming of the parts and also more readily to maintain constant wheel gauge and the contacting surfaces are preferably machined or ground in order to facilitate the mounting and removal of the tires, as well as to prevent the tendency on rough surfaces to "chatter" and work loose. Furthermore, the machined or ground surfaces may be lubricated in any suitable manner to facilitate removal of the tires, to avoid corrosion and to form an additional safeguard against chatter. The tires may be held in place by bolting through lugs $f$ on the rim and tire by means of removable bolts $g$ or by means of bolts pivoted to the rim or by any other suitable means, it being understood that an essential feature of the invention lies in the interchangeable tires or wheels and that any means by which such tires or wheels may be secured in position so as to provide for interchangeability are to be considered as falling within the scope of the invention.

In order to facilitate the interchange of the tires it is evident that some means must be provided whereby the vehicle may be "jacked" up or otherwise supported with the wheels out of contact with the road or rails and according to one convenient method of attaining this object shown in Figure 4 we provide a ramp or elevated rails $h$ or supports on to which the vehicle $i$ is run either by means of wheels or rollers provided on the axles or elsewhere or by the use of the brake drums running on the elevated rails or supports or by other suitable means, the vehicle either being moved on to the ramp or elevated support by its own power, or by power externally applied thereto.

The part beneath the ramp where the change-over occurs may be sunk, as shown, somewhat below the rail and road level in order to avoid elevating the vehicle while ensuring that the wheels are clear of the ground surface, and a suitable incline may, if necessary or desirable, be provided at the part where the vehicle leaves the ramp.

A vehicle in accordance with the invention may be provided with steering means and locking means therefor and also with side or central buffers, screw or other couplings, drawbars, safety chains, brake pipes and, generally, with any appurtenances or accessories which may be essential for use either when the vehicle is travelling as a road vehicle or as a rail vehicle, as, for example, it may be found necessary or desirable to employ hornblocks to ensure that there shall be no creep in the springs at the front and back end of the vehicle.

Furthermore, the power drive for the vehicle may be of such a character that it may proceed under its own power both on rails as well as on the road, or it may be adapted to be drawn on the rails by means of an ordinary locomotive, or it may be used as part of a train to draw or to be drawn either on road or rail.

Figures 1 and 2 show the ordinary steering wheels and axle of a vehicle, and in Figure 2, which shows the same adapted for rail traffic for which the wheels must be locked, such locking is accomplished by the locking bar $k$ bolted or rigidly secured both to arms $l$ on the steering or stub axles and to the lug or bracket $l'$ on the fixed axle.

Suitable starting screws may be used for facilitating the removal of the tires and we may also provide one or more stops on the rim and tire to take up tangential torque and so relieve the bolts from the bending stress which arises from the clearance provided for the purpose of taking up wear and drawing the parts together.

Having now described our invention what we claim as new and desire to secure by Letters Patent is:—

1. A vehicle including a set of wheels, each wheel including a fixed metallic rim of substantial width and coned so that the smaller diameter is positioned at the outside, interchangeable tire carrying and rail engageable metallic rims removably arranged in intimate contact with the metal rims of the wheels, and means for detachably fastening either set of the tire carrying and rail engaging rims to the fixed rims of the wheels.

2. An arrangement as claimed in claim 1 wherein rollers are mounted to move with the wheels and are positioned at the inner sides of the wheels and of considerable less diameter than the wheels, in combination with elevated rails having oppositely inclined end portions engageable by the rollers for elevating the vehicle and the wheels thereof.

In testimony whereof we have signed our names to this specification.

F. P. GRIFFITH.
JAS. LINDSAY.
HOWARD GRACE GEOGHEGAN.